US011509198B2

(12) United States Patent
Heimrich (10) Patent No.: US 11,509,198 B2
(45) Date of Patent: Nov. 22, 2022

(54) ELECTROMAGNETIC INTERFERENCE SUPPRESSION

(71) Applicant: Black & Decker Inc., New Britain, CT (US)

(72) Inventor: Tim Heimrich, Bad Camberg (DE)

(73) Assignee: Black & Decker Inc., New Britain, CT (US)

( * ) Notice: Subject to any disclaimer, the term of this patent is extended or adjusted under 35 U.S.C. 154(b) by 460 days.

(21) Appl. No.: 16/731,405

(22) Filed: Dec. 31, 2019

(65) Prior Publication Data
US 2021/0083556 A1    Mar. 18, 2021

(30) Foreign Application Priority Data
Jul. 26, 2019   (GB) .................................... 1910694

(51) Int. Cl.
| H02K 11/02 | (2016.01) |
| H02K 11/026 | (2016.01) |
| B24B 7/18 | (2006.01) |
| H02K 7/14 | (2006.01) |

(52) U.S. Cl.
CPC .......... *H02K 11/026* (2013.01); *B24B 7/184* (2013.01); *H02K 7/145* (2013.01)

(58) Field of Classification Search
CPC ...... H02K 11/02; H02K 11/023; H02K 11/21; H02K 7/14; H02K 7/145
See application file for complete search history.

(56) References Cited

U.S. PATENT DOCUMENTS

| 3,373,301 A | 3/1968 | Black | |
| 4,145,674 A * | 3/1979 | King | H04B 3/28 333/185 |
| 4,323,804 A * | 4/1982 | Zelt | H02K 11/0141 310/72 |
| 4,384,223 A * | 5/1983 | Zelt | H02K 11/024 310/71 |

(Continued)

FOREIGN PATENT DOCUMENTS

| DE | 202007003794 U1 | 5/2007 |
| DE | 102006022996 A1 | 11/2007 |

(Continued)

OTHER PUBLICATIONS

GB CSER, dated Dec. 2, 2019 in corresponding GB application No. 1910694.7.

(Continued)

*Primary Examiner* — Dang D Le
(74) *Attorney, Agent, or Firm* — Amir R. Rohani (57) ABSTRACT

A power tool comprising: a conductive tube; a rear unit located at a rear end of the tube; a front unit located at a front end of the tube; a battery interface comprising a plurality of terminals, wherein the battery interface is located in the rear unit; a motor located in the front unit; at least one power line for supplying power from the rear unit to the front unit, wherein at least a portion of the power line is located within the tube; and an electromagnetic interference (EMI) suppressor for suppressing EMI from the at least one power line, the EMI suppressor comprising an electrical component electrically connecting the tube to a first terminal of the plurality of terminals.

18 Claims, 6 Drawing Sheets

(56) References Cited

U.S. PATENT DOCUMENTS

2008/0092311 A1    4/2008   Munn et al.
2015/0303777 A1   10/2015   Osborne
2018/0109165 A1    4/2018   Heizmann

FOREIGN PATENT DOCUMENTS

| DE | 102009002420 A1 | 10/2010 |
|----|-----------------|---------|
| DE | 102010003583 A1 | 10/2011 |
| DE | 102010028299 A1 | 11/2011 |
| DE | 102010041507 A1 | 3/2012 |
| DE | 102012222244 A1 | 6/2014 |
| DE | 202015101531 U1 | 11/2015 |
| DE | 202017104255 U1 | 9/2017 |
| DE | 102016220070 A1 | 4/2018 |
| EP | 1211972 B1 | 1/2004 |
| EP | 2427953 A1 | 3/2012 |
| EP | 1436881 B1 | 10/2014 |
| EP | 2220753 B2 | 3/2015 |
| EP | 2913158 B1 | 12/2019 |
| EP | 2807000 B1 | 4/2020 |

OTHER PUBLICATIONS

EP EESR, dated Jan. 19, 2021 in corresponding EP application No. 20185711.7.

* cited by examiner

ELECTROMAGNETIC INTERFERENCE SUPPRESSION

CROSS-REFERENCE TO RELATED APPLICATIONS

This application claims priority, under 35 U.S.C. § 119, to UK Patent Application No. 1910694.7, filed Jul. 26, 2019.

FIELD

The present invention relates to electromagnetic interference (EMI) suppression for power tools.

BACKGROUND

Electromagnetic interference (EMI), also known as radio-frequency interference (RFI), is disturbance that affects an electrical circuit due to either electromagnetic induction or electromagnetic radiation emitted from an external source. In power tools, EMI can be radiated by a motor, and in particular, brushed motors. In brushed motors, where commutation of the armature is accomplished as a result of contact between the brushes and the commutator bars, EMI can be substantial. The EMI energy may cause electromagnetic interference with other components in the vicinity of the power tool.

Certain international standards (e.g., EN55014-1: https://ec.europa.eu/eip/ageing/standards/home/sensors-actuators-and-alarms/en-55014_en) require the amount of electromagnetic radiation emitted by motorized devices such as electric tools to be limited below a (frequency dependent) amount specified by the standards.

Various EMI suppression components (hereinafter also referred to as "EMI components") may be utilized to reduce the EMI generated by power tool motor components. Capacitors are exemplary components used as EMI components. The challenge faced by power tool design engineers is how to meet the regulatory EMI requirements in a cost and space effective manner.

SUMMARY

According to an aspect there is provided a power tool comprising: a conductive tube; a rear unit located at a rear end of the tube; a front unit located at a front end of the tube; a battery interface comprising a plurality of terminals, wherein the battery interface is located in the rear unit; a motor located in the front unit; at least one power line for supplying power from the rear unit to the front unit, wherein at least a portion of the power line is located within the tube; and an electromagnetic interference (EMI) suppressor for suppressing EMI from the at least one power line, the EMI suppressor comprising an electrical connection between the tube and a first terminal of the plurality of terminals.

The EMI suppressor may be located in the rear unit.

The EMI suppressor may comprise an electrical component electrically connecting the tube to the first terminal.

The electrical component may be a resistor. The EMI suppressor may comprise the resistor only and no other electrical component.

The motor may be a brushless motor.

The power tool may further comprise a motor controller located in the front unit, wherein the at least one power line electrically connects the battery interface to the motor controller.

The power tool may further comprise a motor controller located in the rear unit, wherein the at least one power line electrically connects the motor controller to the motor.

The motor controller may comprise at least one switching element configured to switch a direction of electric current flowing in the at least one power line.

The at least one power line may comprise three power lines, each of the three power lines are configured to provide power to the motor for driving the motor.

The first terminal may be a negative terminal or ground.

The tool may be a pole sander. The tool may further comprise a vacuum tube having an inlet located in front unit and an outlet located in the rear unit, wherein at least a portion of the vacuum tube is located within the conductive tube.

The tool may be a string trimmer, poled hedge trimmer, poled chain saw, or poled blower.

The power tool may further comprise a battery, wherein the battery is configured to removably couple to the battery interface.

According to another aspect there is provided a method of suppressing electromagnetic interference (EMI) in a power tool, the power tool comprising: a conductive tube; a rear unit located at a rear end of the tube; a front unit located at a front end of the tube; a battery interface comprising a plurality of terminals, wherein the battery interface is located in the rear unit; a motor located in the front unit; at least one power line for supplying power from the rear unit to the front unit, wherein at least a portion of the power line is located within the tube, the method comprising: electrically connecting the conductive tube to a first terminal of the plurality of terminals.

The conductive tube may be connected to the first terminal via an EMI suppressor, the EMI suppressor may comprise an electrical component.

The electrical component may be a resistor and the EMI suppressor may comprise the resistor only.

BRIEF DESCRIPTION OF THE DRAWINGS

Various other aspects and further embodiments are also described in the following detailed description and in the attached claims with reference to the accompanying drawings, in which:

DETAILED DESCRIPTION

The present invention relates to suppressing EMI radiated from motorized tools and, in particular, poled tools. In the description below, the EMI suppression technique will be described in relation to a motorized pole sander. However, the EMI suppression technique can be implemented on other motorized poled tools such as string trimmers, pole hedge trimmers, pole saws and poled blowers.

A motorized pole sander may be used to remove material from various types of surfaces. For instance, the motorized sander may be used to remove material from drywall surfaces, concrete surfaces, wood surfaces, and other surfaces. Additionally, the motorized sander also may be used for scuffing or roughing up a painted surface prior to applying another coat of paint. In addition, it may be used as a floor buffer, a device for removing barnacles on fiberglass boats, removing textures on a ceiling, wallpaper, and wallpaper paste as well as other assorted planar surface sanding operations. Motorized pole sanders may also be connected to a vacuum source to remove material as the sander operates.

Figure 1:
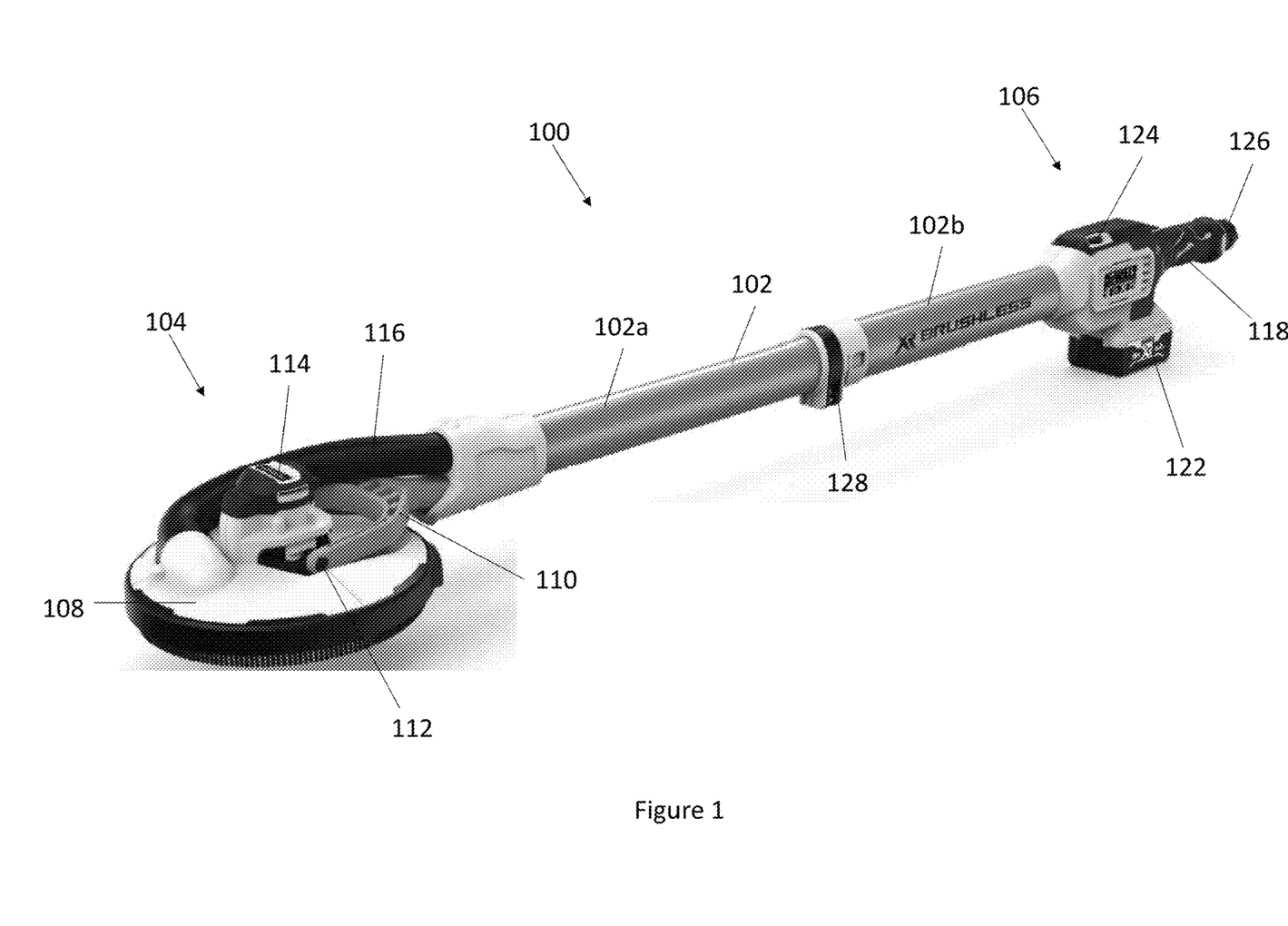
FIG. 1 shows a perspective view of a pole sander.

FIG. 1 shows an example of a motorized pole sander 100. The sander comprises a tube 102. Disposed at the front end of the tube 102 is a front unit 104 and disposed at the rear end of the tube 102 is a rear unit 106.

The front unit 104 comprises a sanding head 108. The sanding head may be mounted to the front end of the metal tube 102 by an arm 110 and pivotal joint 112. The sanding head 108 may include a sanding drive plate (not shown) that is coupled to a drive shaft of a motor 114.

In some embodiments, the motor 114 is a brushed d.c. motor. In other embodiments, the motor 114 can be a d.c. motor, an a.c. motor, or a multiphase motor controlled by a motor controller. The motor 114 may be a permanent magnet brushless motor, a switched reluctance motor, a flux switching motor, or other brushless motor type. The drive shaft of the motor 114 may be directly coupled to the sanding drive plate. Alternatively, the drive shaft of the motor 114 may be coupled to the sanding drive plate via a gear mechanism and/or a transmission mechanism.

Figure 2A:
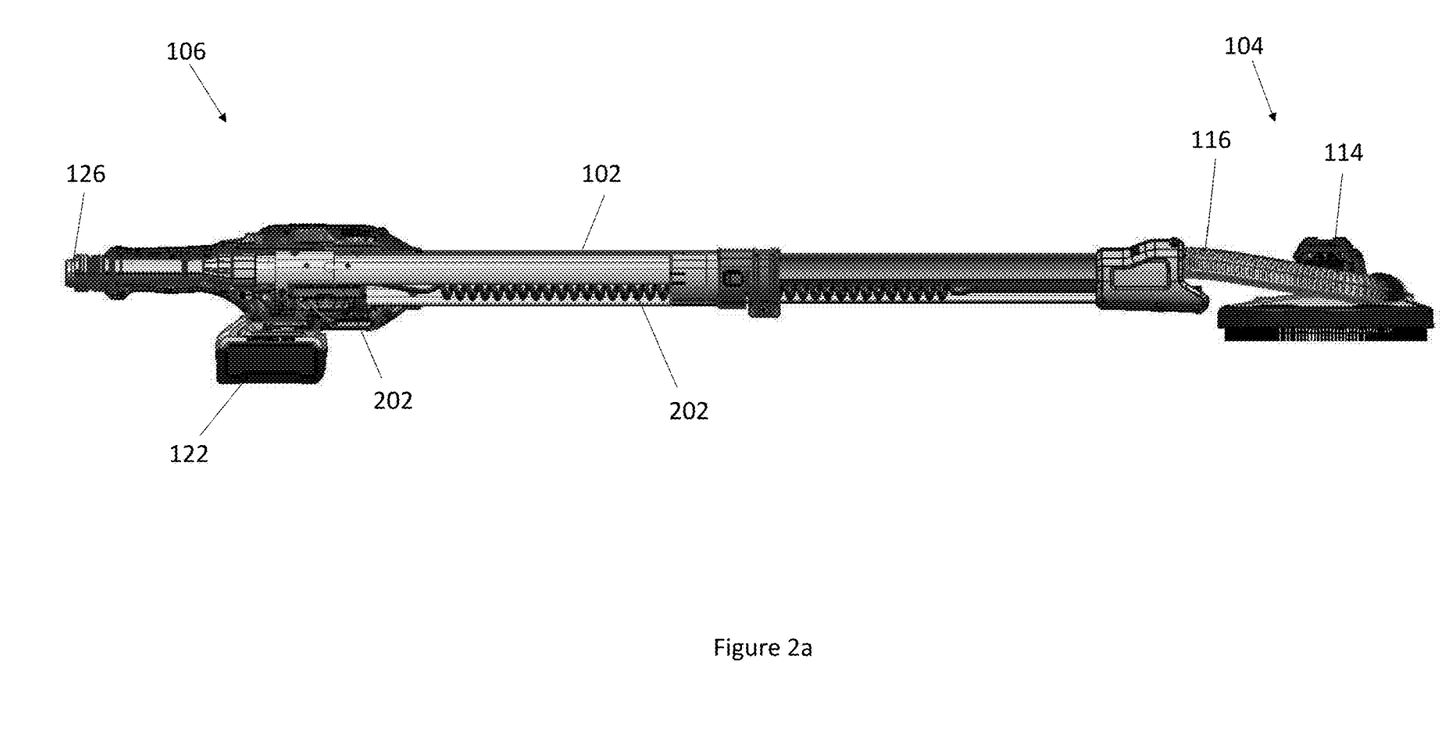
FIG. 2a shows an internal view of the pole sander.
Figure 2B:
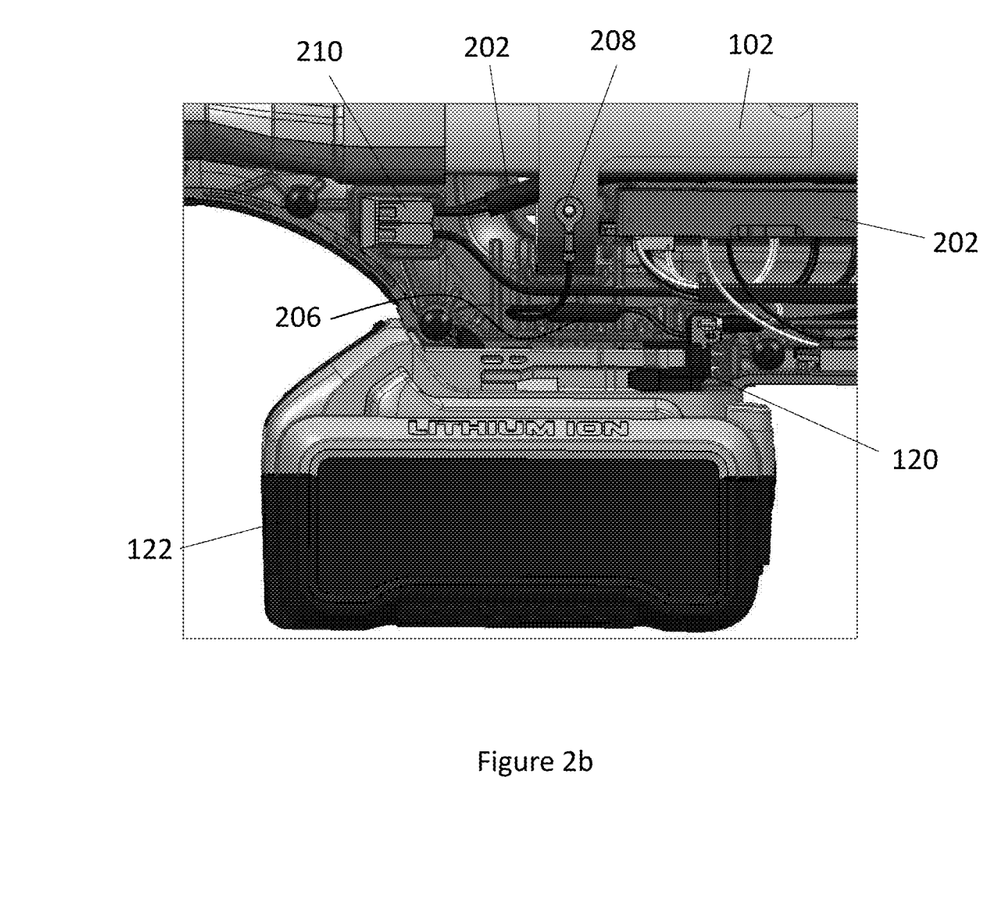
FIG. 2b shows a close-up of the internal view.

The rear unit 106 comprises a handle 118 and a battery interface 120 (as shown in FIG. 2b) for removably receiving a battery 122. The rear unit 106 includes an on/off toggle switch 302 (shown in FIG. 3). In one implementation, the motor speed may be varied by a variable speed thumb wheel switch 124. To operate the sander, the user may grasp the handle 118 with one hand and the pole 102 with the other hand and toggle the switch 302 to turn the motor on or off.

The motor 114 is electrically connected to a power source via a motor controller 202 (shown in FIG. 2a). As mentioned above, the power source is a battery 122 comprising a plurality of battery cells. In some embodiments, the battery 122 is a lithium ion battery. In other embodiments, the battery 122 may be any other suitable type of battery for use in a motorized sander. In other embodiments the motorized sander 100 additionally or alternatively comprises a mains electricity supply (not shown).

The sanding head 108 may be coupled to a vacuum source (not shown) via a vacuum tube 116 to extract the material that has been removed by the sanding operation. The vacuum tube 116 may extend through tube 102 from the front unit 104 to the rear unit 106 and to a vacuum hose connector 126. The vacuum hose connector 126 may connect to vacuum source via a hose (not shown).

The tube 102 may be made conductive material such as a metal (e.g., aluminum) or non-metallic conductors (e.g., graphite). The tube 102 may be made from a rigid material. The tube 102 may be formed from a single piece or from two or more portions coupled together. As shown in FIG. 1, tube 102 comprises a first tube portion 102a and a second tube portion 102b coupled together by a coupling mechanism 128, such as a bracket. The length of the tube 102 may be adjusted by unlocking the coupling mechanism 128 and sliding one tube portion 102a in or out of the other tube portion 120b in a telescopic manner. The coupling mechanism 128 can be locked at the desired tube length. The tube 102 may be hollow to provide an interior space along the length of the tube for wires and, optionally, the vacuum tube extending between the front and rear units 104 and 106. The tube 102 may have an oval cross-sectional shape (as shown in FIG. 1) or any other suitable cross-sectional shape (e.g., circle, square, trapezoid, etc).

FIG. 2a shows the interior of the pole sander 100. FIG. 2b shows a close-up of interior around the battery interface 120. As shown, the pole sander 100 includes a motor 114 located in the front unit 104 and a motor controller 202 located in the rear unit 106. The motor controller 202 is electrically connected to the battery 122 via the battery interface 120. One or more power lines supply power from the rear unit 106 to the front unit 104. In this embodiment, the one or more power lines electrically connect the motor controller 202 to the motor 114. The power lines provide power for driving the motor 114. In the embodiment of FIG. 2a, the power lines are provided in a retractable cable 204. The retractable cable 204 can be extended or compressed as the as the length of tube 102 is varied by a user. The power lines may be provided in other suitable types of cables.

In an embodiment, the motor 114 is the three-phase brushless motor, which has three power lines 204a, 204b and 204c (best shown in FIG. 3) electrically connecting the motor controller 202 with the brushless motor 114. Power line 204a connects to first phase terminal for providing current to a first coil of the brushless motor 114, power line 204b connects to second phase terminal for providing current to a second coil of the brushless motor 114 and power line 204c connects to third phase terminal for providing current to a third coil of the brushless motor 114. Power lines 204a, 204b and 204c may be provided in retractable cable 204 and are insulated from each other. Each power line has at least a positive connection wire and a negative connection wire (not shown) to provide a potential difference at each phase.

In other embodiments, the number of power lines required may be more or less depending on the type of motor being implemented. For example, a single power line (with a positive connection wire and a negative connection wire) may be required for a single-phase brushless motor. Control lines (not shown) may also electrically connect the motor 114 and the motor controller 202. The control lines may provide control information (e.g., rotor position, motor temperature, etc) to the motor controller 202. The control lines may also be provided in the retractable cable 204 and insulated from the power lines.

The power lines 204 are disposed inside and along the tube 102 and extend from the rear unit 106 to the front unit 104. The battery 122 is electrically connected to the motor 114 via the motor controller 202. In other words, electric power from the battery 122 is supplied to the motor 114 via the motor controller 202. The power lines 204 may comprise a wire-to-wire connector 210, as shown in FIG. 2b for easier connection and assembly between the controller 202 and the motor 114.

It has been found by the inventors that providing an electrical connection between a terminal in the battery interface and the tube unexpectedly and surprisingly reduces the EMI emitted from the sander when it is in use. In one embodiment, a direct wire connection may be provided between the tube and the battery terminal. In another embodiment, the pole sander 100 comprises a resistor 206 that is electrically connected to a terminal in the battery interface 120 and to the tube 102. In this embodiment, the resistor 206 is connected to the terminal by soldering and connected to the pole by a ring terminal 208. In other embodiments, other connection means may be used to electrically connect the resistor to the terminal and tube.

In conventional EMI suppression techniques, EMI circuits comprising a plurality of relatively expensive, heavy and large components (such as multiple capacitors) are employed to reduce EMI. These components are mounted to a printed circuit board, which in turn is usually mounted to the motor housing, which is not ideal. In the present invention, the inventors have found a cheap, light-weight, space-saving and efficient way of reducing EMI by electrically connecting the tube 102 to the battery terminal.

As mentioned above, the rear unit 106 comprises the motor controller 202 and the motor 114 is located in the front unit 104. The motor controller 202 applies the necessary phase voltages to the motor 114 via power lines 204. Each phase is connected to either the positive or negative terminal of the battery depending on the sensed rotor position of the motor and the switching pattern of employed by the motor controller 202. When a phase changes from positive to negative (and vice versa), a sharp edge occurs, which leads to a fundamental sinusoidal frequency with a lot of harmonics on top of it. The harmonics radiate through the power lines 204 and cause EMI to be radiated from the sander during use. The inventors have found that by electrically connecting the tube 102 to the battery (e.g., via resistor 206), the conductive tube 102 can be pulled to the ground level or negative level of the battery and so the tube behaves as an electromagnetic shield, which dampens the harmonic waves radiated by the power lines 204. Thus, the inventors have found a cheap, light-weight, space-saving and efficient EMI suppression technique.

Providing a resistor 206 is preferable over a direct wire connection as it can limit the current drawn from the battery in the case where electrical isolation gets damaged and the power wires touch the tube 102. The resistance value of the resistor 206 may be selected depending on a maximum safe current for the battery. For example, if the maximum safe level of current for a 20V battery is 100 mA, a 2000 resistor may be selected.

In other embodiments, electrical components other than the resistor 206 may be used to suppress EMI radiating from the power lines 204. For example, capacitors and/or inductors could be implemented depending on the EMI frequency that needs to be dampened. Capacitors and/or inductors may be selected in cases where only certain EMI frequencies need to be dampened.

Figure 3:
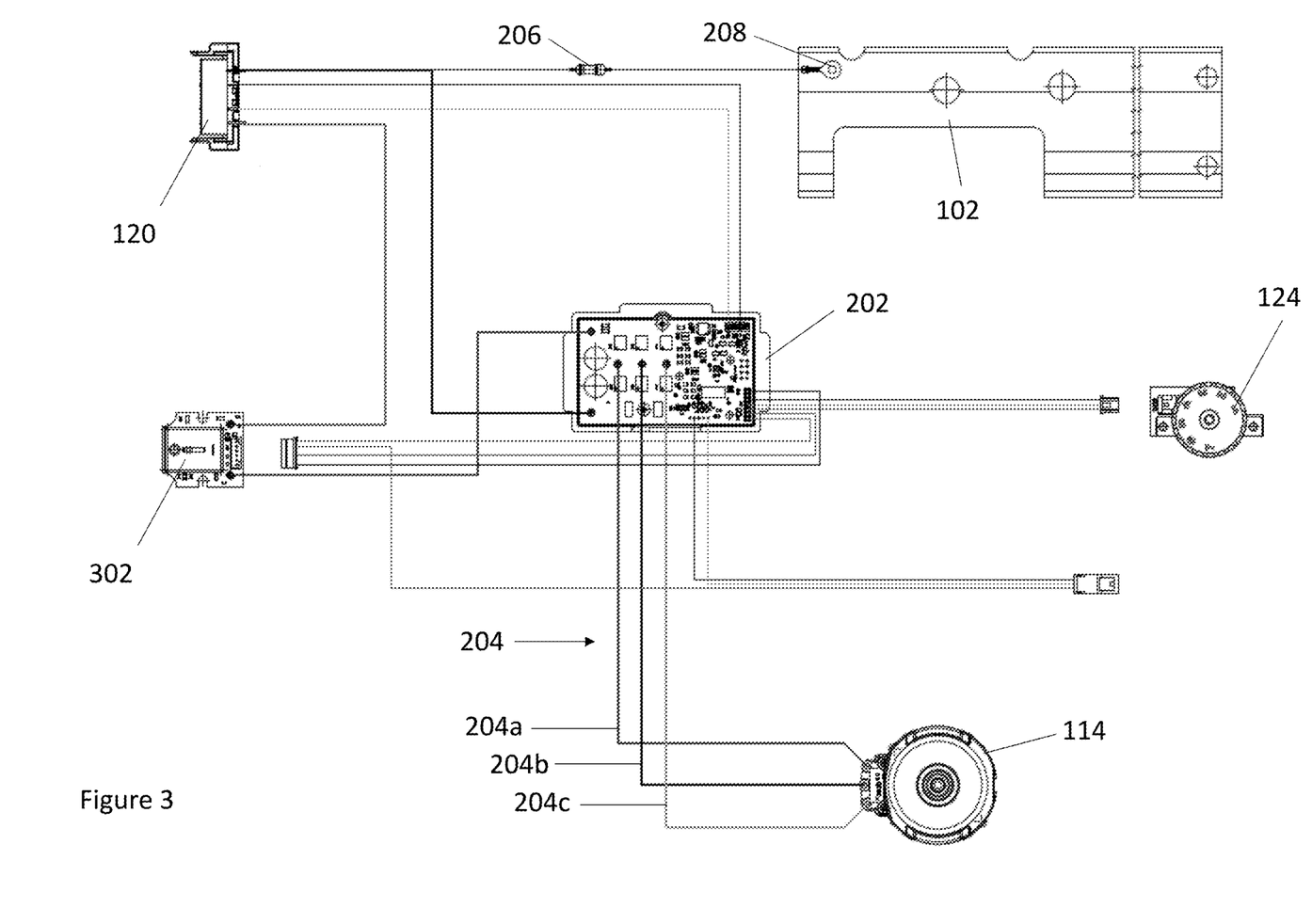
FIG. 3 shows an electrical diagram of the pole sander.

FIG. 3 shows the electrical layout of the pole sander. For the purposes of clarity, the power lines 204 are shown separately to the tube 102 in FIG. 3, however, at least a portion of the power lines 204 will run within the tube 102.

Figure 4:
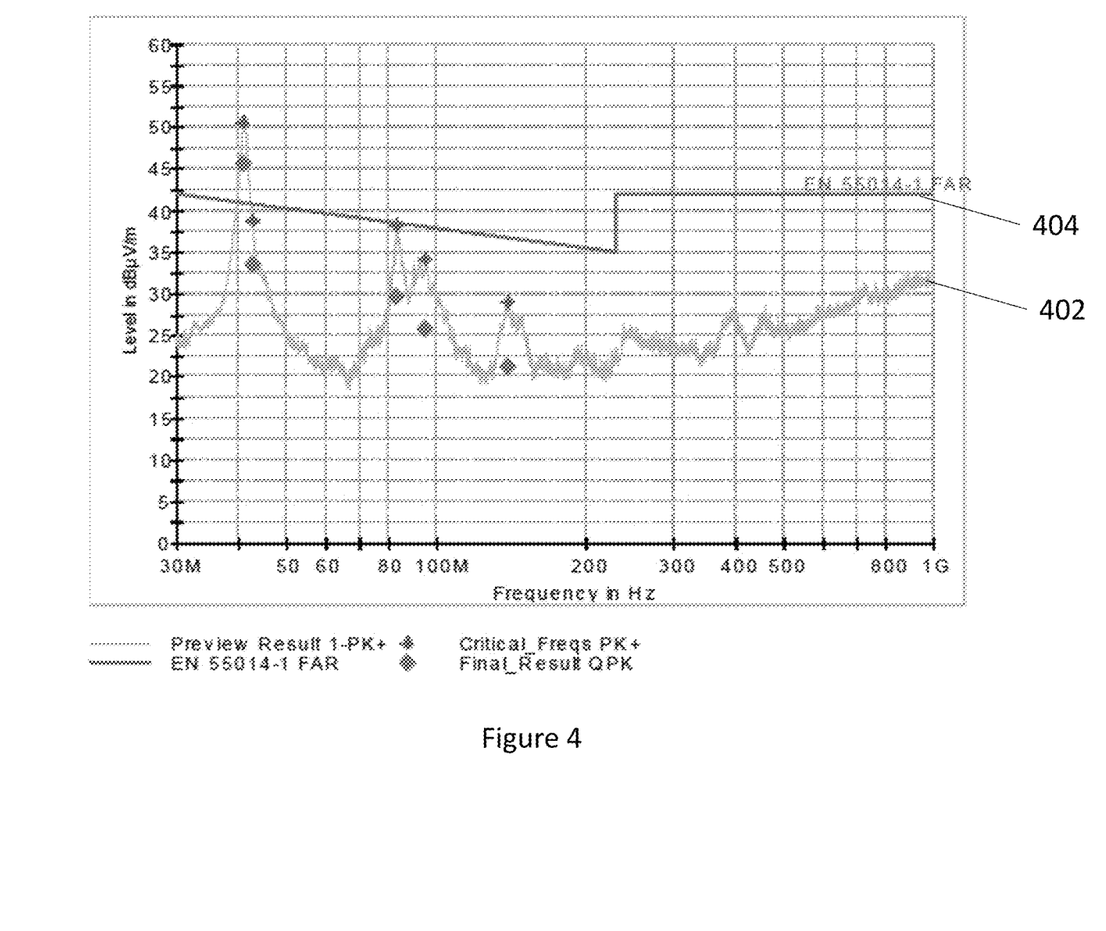
FIG. 4 shows the EMI radiated by a pole sander without EMI suppression.
Figure 5:
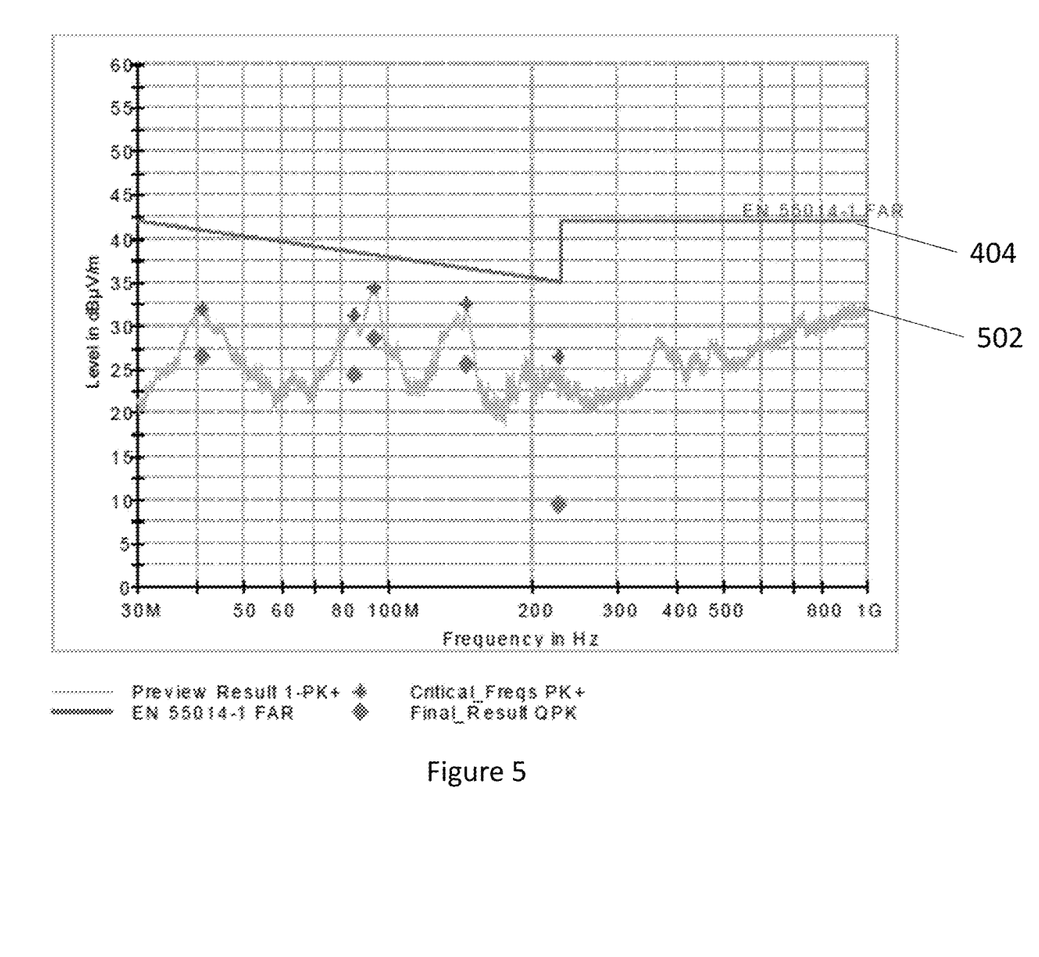
FIG. 5 shows the EMI radiated by the pole sander with EMI suppression.

FIG. 4 shows the EMI radiated 402 by a pole sander during operation without the EMI suppression technique mentioned above. As shown, at certain frequencies, the level of EMI 402 is greater than the maximum level 404 required by the EN55014-1 standard. FIG. 5 shows the level of EMI radiation 502 during operation of the pole sander when the resistor 206 is connected between the battery terminal and the tube 102. As shown, the level of EMI radiation emitted is below the maximum level required by the EN55014-1 standard. Thus, the EMI suppression technique of the present invention effectively reduces EMI emissions.

In another embodiment, the motor controller is located in the front unit (instead of the rear unit, as described in the embodiment of FIGS. 2a, 2b and 3). In this embodiment, one or more power lines disposed in the tube supply power from the battery interface in the rear unit to the motor controller in the front unit. The motor controller is electrically connected to the motor (which is also in the front unit). In an embodiment, the motor controller may be mounted to the motor housing and current is supplied to the motor directly from the controller. In other embodiments, the motor controller may supply current to the motor via further power supply lines. By providing the motor controller in the front unit, adjacent to or attached to the motor, the length of the electrical connection between the motor controller and the motor is minimized. This reduces the effect of the EMI radiating from the connection between the motor controller and the motor. However, the power lines located in the tube that electrically connect the battery (in the rear unit) to the controller (in the front unit) may still emit EMI. Switching of motor controller and load variation at the motor can cause current fluctuations towards the battery, which in turn causes EMI to be radiated. The EMI radiated in this way is particularly problematic for high power tools. As in the previous embodiment, providing an electrical connection between the battery terminal and the tube (e.g., via a direct wire connection or an electrical component such as a resistor) reduces the EMI emitted in this way by making the tube behave like an electromagnetic shield.

In another embodiment two or more embodiments are combined. Features of one embodiment can be combined with features of other embodiments.

Embodiments of the present invention have been discussed with particular reference to the examples illustrated. However, it will be appreciated that variations and modifications may be made to the examples described within the scope of the invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A power tool comprising:
   a conductive tube;
   a rear unit located at a rear end of the conductive tube;
   a front unit located at a front end of the conductive tube;
   a battery interface comprising a plurality of terminals, wherein the battery interface is located in the rear unit;
   a motor located in the front unit;
   at least one power line for supplying power from the rear unit to the front unit, wherein at least a portion of the power line is located within the conductive tube; and
   an electromagnetic interference (EMI) suppressor for suppressing EMI from the at least one power line, the EMI suppressor comprising an electrical connection between the conductive tube and the battery interface.

2. A power tool according to claim 1, wherein EMI suppressor is located in the rear unit.

3. A power tool according to claim 1, wherein the EMI suppressor comprises an electrical component electrically connecting the conductive tube to the battery interface.

4. A power tool according to claim 3, wherein the electrical component is a resistor.

5. A power tool according to claim 4, wherein the EMI suppressor comprises the resistor only and no other electrical component.

6. A power tool according to claim 1, wherein the motor is a brushless motor.

7. A power tool according to claim 1, further comprising a motor controller located in the front unit, wherein the at least one power line electrically connects the battery interface to the motor controller.

8. A power tool according to claim 1, further comprising a motor controller located in the rear unit, wherein the at least one power line electrically connects the motor controller to the motor.

9. A power tool according to claim 8, wherein the motor controller comprises at least one switching element configured to switch a direction of electric current flowing in the at least one power line.

10. A power tool according to claim 8, wherein the at least one power line comprises three power lines, each of the three power lines is configured to provide power to the motor for driving the motor.

11. A power tool according to claim 1, wherein the EMI suppressor is coupled to a negative terminal or a ground terminal of the battery interface.

12. A power tool according to claim 1, wherein the tool is a pole sander.

13. A power tool according to claim 12, further comprising a vacuum tube having an inlet located in front unit and an outlet located in the rear unit, wherein at least a portion of the vacuum tube is located within the conductive tube.

14. A power tool according to claim 1, wherein the tool is a string trimmer, poled hedge trimmer, poled chain saw, or poled blower.

15. A power tool according to claim 1, further comprising a battery, wherein the battery is configured to removably couple to the battery interface.

16. A method of suppressing electromagnetic interference (EMI) in a power tool, the power tool comprising: a conductive tube; a rear unit located at a rear end of the conductive tube; a front unit located at a front end of the conductive tube; a battery interface comprising a plurality of terminals, wherein the battery interface is located in the rear unit; a motor located in the front unit; at least one power line for supplying power from the rear unit to the front unit, wherein at least a portion of the power line is located within the conductive tube, the method comprising:
   electrically connecting the conductive tube to the battery interface.

17. A method according to claim 16, wherein the conductive tube is connected to the battery interface via an EMI suppressor, the EMI suppressor comprising an electrical component.

18. A method according to claim 17, wherein the electrical component is a resistor and the EMI suppressor comprises the resistor only.

* * * * *